Oct. 5, 1926.
E. D. CHURCH
1,601,811
AUTOMATIC MEASURING DEVICE
Filed Dec. 23, 1925      2 Sheets-Sheet 1
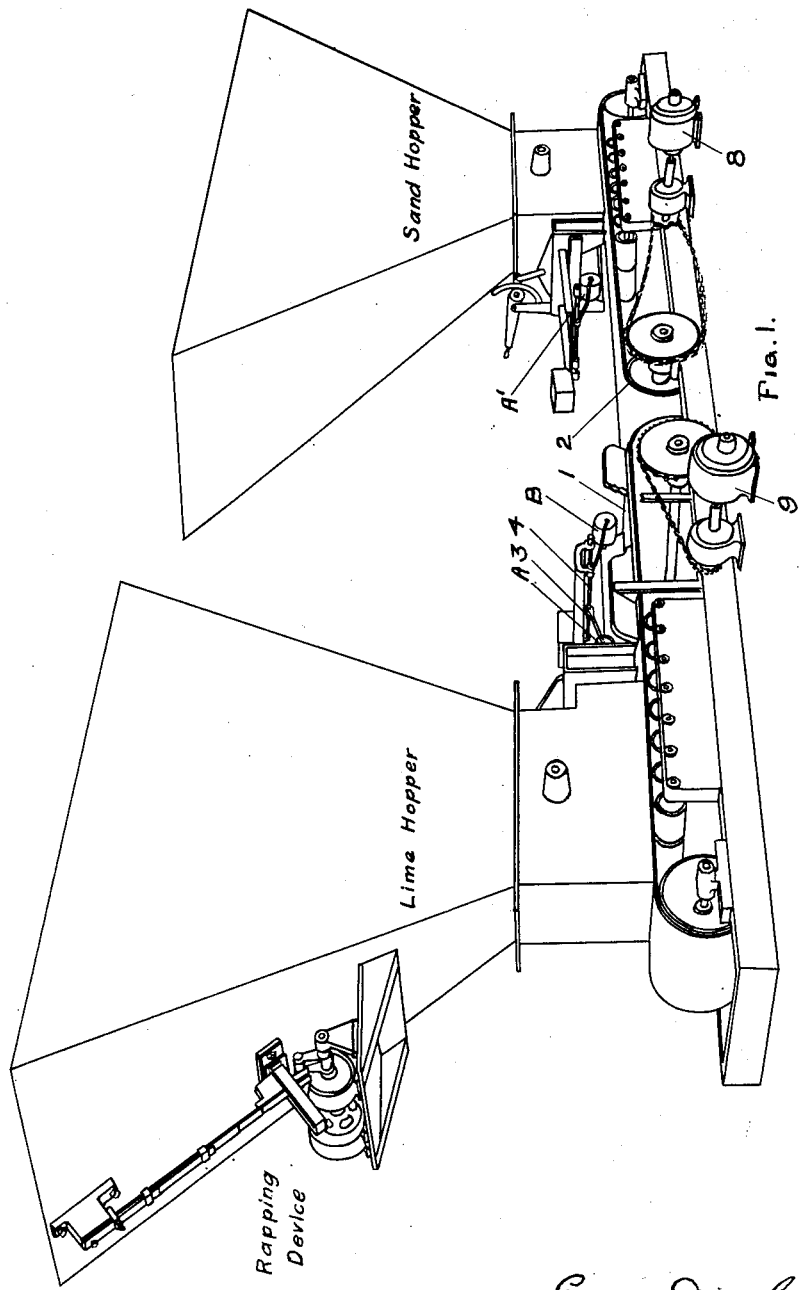
Inventor
Edgar D. Church
By George B. Willey
Attorney

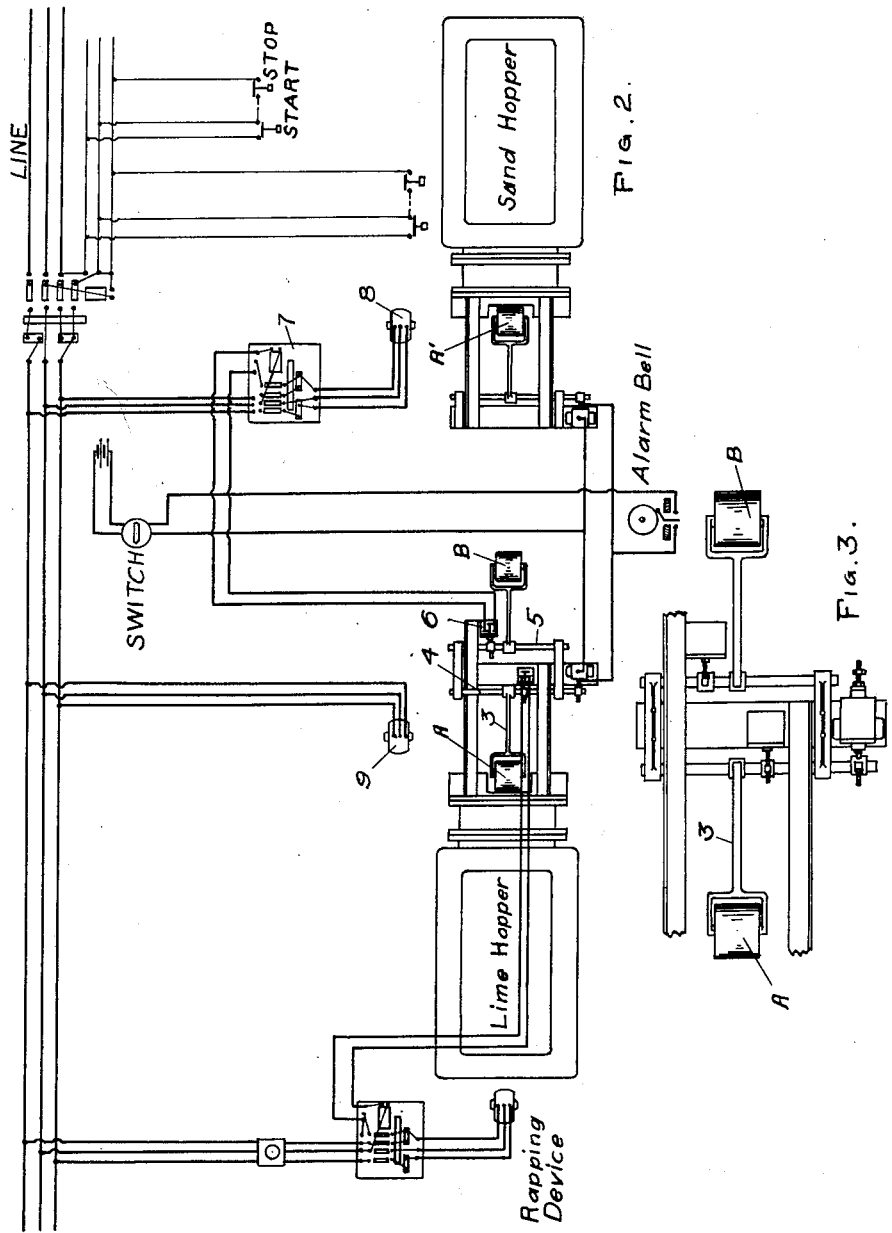

Patented Oct. 5, 1926.

1,601,811

UNITED STATES PATENT OFFICE.

EDGAR D. CHURCH, OF SAGINAW, MICHIGAN, ASSIGNOR TO JACKSON & CHURCH CO., OF SAGINAW, MICHIGAN, A CORPORATION OF MICHIGAN.

AUTOMATIC MEASURING DEVICE.

Application filed December 23, 1925. Serial No. 77,224.

This invention relates to measuring devices and pertains more particularly to devices adapted to measuring two kinds of bulk materials that are to be simultaneously delivered in predetermined proportions.

Such machines are used in the manufacture of many products, for example, sand lime bricks, where lime and sand are volumetrically measured while being fed out from storage hoppers by conveyor belts or their equivalents.

My improvement pertains more particularly to novel means whereby two such machines are operated so that if the thickness of the layer of material delivered to the belt by either machine becomes less than the predetermined thickness which its hopper feed gate is adjusted to deliver, that machine will automatically act to shut down the other machine that is co-operating with it. For example, if two measuring machines are arranged, one to deliver lime and the other to deliver sand, at predetermined rates and simultaneously, and one of them, say, the lime measuring machine, fails to deliver its material at the proper rate, it will automatically cause the delivery belt of the co-operating sand machine to stop.

The purpose of such co-operative control of either machine by the other is to prevent feeding an improperly proportioned mixture into the mixer ahead of the brick-making machine, and to maintain uniform quality of the manufactured product.

Another object of my improvement is to so arrange the device that this stoppage of the second machine will occur only at such time that the conveyor belt of the first machine has been emptied of material. I thereby avoid all likelihod of stopping the belt of the second machine too soon. If that were permitted to occur, all the lime that happened to be in transit on the first belt would be delivered, but the required corresponding quantity of sand would of course fail to be delivered from the second machine.

The inventive conceptions in my improved machine are, therefore, seen to be grouped around the idea of employing one of the machines to stop the operation of the other when the rate of delivery from either machine varies so as to materially alter the predetermined proportions of the desired mixture, and to prevent the delivery of either kind of material without the simultaneous delivery of a corresponding quantity of the other material.

Measuring machines of the kind to which my invention is applicable are shown in United States Patent No. 1,460,573, issued July 3, 1923, to which reference is invited. As therein explained, such plants employ one measuring machine that takes its supply from a lime hopper and a second machine supplied from a sand hopper, each material traveling to a mixer on an endless belt conveyor.

The gate of exit from the sand hopper and the exit gate from the lime hopper are usually arranged to deliver upon their respective conveyors a uniform thickness of material, the speed ratio of the two belts being usually such that predetermined volumetric quantities of sand and lime are automatically and continuously delivered to the mixer. If the feed from both hoppers is uniform the thickness of material on the belts, and consequently proper mixing proportions will be maintained. If, on the contrary, the rate of feed from, say, the lime hopper, changes so that the proper thickness of lime is not maintained on the belt, the devices of the patent above refered to are automatically set in motion to correct the difficulty. That is to say, hopper agitators are put in motion as heretofore, and signals, visual or audible, are actuated to indicate that the machine is no longer properly measuring its proportion of the aggregate.

My present improvement also employs, as in the patent, referred to, two such machines, one for measuring a material such as lime, and the other for measuring the other ingredient as sand. I arrange these two machines as described in the patent, to deliver into a suitable mixer.

According to my present invention, however, the measuring device of one of the machines not only sets in motion the various mechanisms for correcting a defective feed in that machine, but, as above stated, also automatically stops the belt of the companion machine. In the preferred embodiment of my invention, this stoppage of the second belt occurs only after the material in transit on the first belt has been delivered, as previously stated.

With the foregoing and certain other objects in view, which will appear later in the specifications, my invention comprises the devices described and claimed and the equivalents thereof.

In the drawings, Fig. 1 is a perspective view of two cooperating measuring machines embodying my improvement and arranged end to end.

Fig. 2 is a diagrammatic plan view, showing a suitable electric wiring system as applied to my invention.

Fig. 3 is an enlarged top plan view of the gauging mechanism of one of the machines.

As is clearly shown in the drawings, the machines are fitted respectively with a lime hopper and a sand hopper and they deliver the measured material by means of conveyor belts or equivalent carriers 1, 2 substantially in the manner described in the patent referred to.

A rider A or A', which may be in the form of a cylindrical roller, is adapted to ride upon the top surface of the traveling layer of material. Rider A is preferably mounted on an arm 3 fixed to a rocker shaft 4.

A plurality of suitable electric contact devices are arranged in proximity to the shaft 4, as described in the previous patent, whereby electrically actuated rapping devices are put into operation.

When a rider A encounters a thin layer of material on the belt, the rapping and signaling devices are made to warn the operator and to automatically correct the impaired rate of feed.

In employing my improvement there is preferably provided a second rider B mounted on a rocker shaft 5 and adapted to break electric contact in a contact device 6 when rider B encounters a thin place in the layer of material.

A magnetic switch 7 suitably connected to the contact device, the line and the motor 8 of the sand measuring device, enables the operation of the contact device 6 to stop motor 8 whenever rider B drops. If the normal feed of the lime measuring machine is again established, either by the action of the customary automatic rapping devices, or by the attendant, rider B will rise as the thicker layer of material passes under it and the contact in device 6 will again be actuated to start motor 8.

In some cases it may not be desirable to employ the second rider B, as shown herein, but to use the rider A for the purpose of starting and stopping motor 8. However, I prefer the arrangement shown, because it permits rider B to be located near the delivery end of the belt, so that the rider will not stop motor 8 until belt 1 has been emptied of material. Otherwise, if motor 8 were stopped as soon as rider A encountered a thin spot in the material the lime already on belt 1 between the hopper and the delivery end would be discharged without any accompanying quantity of sand from the other machine.

I have not illustrated and described in detail the specific electric contact mechanisms and the levers by which motor 8 may be automatically stopped, for the reason that such mechanisms are already well-known in the art and their specific construction does not form a part of my present invention. Also to avoid complication in the drawings and description I have shown lime belt 1 alone as being equipped with a rider adapted to stop the sand belt 2. It will be understood that in practice both the lime machine and the sand machine may be so equipped, and that a failure of the material supply from the sand machine may automatically stop the motor 9 that drives the lime measuring machine.

I have shown and described the two conveyors as operated by electric motor and have shown the rider as controlling the starting and stopping of the motor by electrical means. While that is the preferred arrangement, yet I do not desire to restrict the embodiments of my invention to the use of electric motors specifically, for various other well known types of driving devices may be employed without going outside the scope of my invention as set forth in the claims.

Having thus described my invention, what I claim and desire to secure by Letters Patent is:

1. In combination, two material measuring machines each having a conveyor and a driving motor, a vertically movable rider disposed above the conveyor of one of said machines, an electrical contact device adapted to be actuated by said rider, a magnetic switch in circuit with the motor of the other machine, said contact device in circuit with and adapted to control said switch, whereby depressing the rider of a measuring machine results automatically in stopping the conveyor of the other machine.

2. In combination, two material measuring machines each having a conveyor and a driving motor, a vertically movable rider disposed above the conveyor of one of said machines and near the end of its belt, an electrical contact device adapted to be actuated by said rider, a magnetic switch in circuit with the motor of the other machine, said contact device in circuit with and adapted to control said switch whereby depressing the rider of a measuring machine results automatically in stopping the conveyor of the other machine when the belt of the first machine becomes empty.

3. In combination, two material measuring machines each having a conveyor, driving means for said conveyors, a vertically movable rider disposed above the conveyor of one of said machines near the end thereof and adapted to ride upon a layer of material on said conveyor, controlling means operatively connecting said rider and driving means and adapted when said rider is depressed to render said driving means inoperative to thereby stop the conveyor of one of said machines when the conveyor of the other machine becomes empty.

In testimony whereof, I affix my signature.

EDGAR D. CHURCH.